(12) United States Patent
Zandonadi et al.

(10) Patent No.: US 6,985,976 B1
(45) Date of Patent: Jan. 10, 2006

(54) SYSTEM, METHOD, AND COMPUTER PROGRAM PRODUCT FOR MEMORY MANAGEMENT FOR DEFINING CLASS LISTS AND NODE LISTS FOR ALLOCATION AND DEALLOCATION OF MEMORY BLOCKS

(75) Inventors: Marco Zandonadi, Berkeley, CA (US); Roberto Attias, Richmond, CA (US); Akash R. Deshpande, San Jose, CA (US)

(73) Assignee: Teja Technologies, Inc., San Jose, CA (US)

( * ) Notice: Subject to any disclaimer, the term of this patent is extended or adjusted under 35 U.S.C. 154(b) by 62 days.

(21) Appl. No.: 10/371,830

(22) Filed: Feb. 20, 2003

Related U.S. Application Data

(60) Provisional application No. 60/359,453, filed on Feb. 22, 2002, provisional application No. 60/376,824, filed on Apr. 29, 2002, provisional application No. 60/432,778, filed on Dec. 11, 2002, provisional application No. 60/432,757, filed on Dec. 11, 2002, provisional application No. 60/432,954, filed on Dec. 11, 2002, provisional application No. 60/432,928, filed on Dec. 11, 2002, provisional application No. 60/432,872, filed on Dec. 11, 2002, provisional application No. 60/432,785, filed on Dec. 11, 2002, provisional application No. 60/433,348, filed on Dec. 12, 2002.

(51) Int. Cl.
*G06F 13/00* (2006.01)
*G06F 17/00* (2006.01)
*G06F 9/44* (2006.01)

(52) U.S. Cl. .................. 710/56; 707/200; 707/206; 711/1; 711/6; 711/100; 711/170; 711/171; 711/172

(58) Field of Classification Search .................. 710/56; 711/170–172, 1, 6, 100; 707/200, 206
See application file for complete search history.

(56) References Cited

U.S. PATENT DOCUMENTS

| | | | |
|---|---|---|---|
| 4,800,521 A | 1/1989 | Carter et al. |
| 5,247,677 A | 9/1993 | Welland et al. |
| 5,260,868 A | 11/1993 | Gupta et al. |
| 5,301,312 A | 4/1994 | Christopher et al. |
| 5,465,335 A | 11/1995 | Anderson |
| 5,530,879 A | 6/1996 | Crump et al. |
| 5,619,409 A | 4/1997 | Schultz et al. |

(Continued)

OTHER PUBLICATIONS

Deshpande, et al., "The Shift Programming Language for Dynamic Networks of Hybrid Automata", *IEEE Transactions on Automatic Control*, Apr. 1998, 43(4): 584-587.

(Continued)

*Primary Examiner*—Tammara Reyton
(74) *Attorney, Agent, or Firm*—Dorsey & Whitney LLP

(57) ABSTRACT

Method, system, apparatus and computer program product for memory management. In one embodiment the method includes: configuring a first memory including allocating at least one node; and defining a status including: defining a class list, wherein each node is capable of storing a class instance corresponding to a class selected from said class list; and defining a node list to identify an allocation status of each node including an available status, and an allocated status; receiving an allocation request including a class identifier, responding to the allocation request with a node identifier representing said available node and updating the available node allocation status; otherwise responding with a failure indication; and receiving a deallocation request and responding to said deallocation request by updating the allocation status to the available status. A system, router, computer program and computer program product are also disclosed.

19 Claims, 7 Drawing Sheets

U.S. PATENT DOCUMENTS

| | | | |
|---|---|---|---|
| 5,636,124 A | 6/1997 | Rischar et al. | |
| 5,640,563 A | 6/1997 | Carmon | |
| 5,701,481 A | 12/1997 | Hosaka et al. | |
| 5,781,187 A | 7/1998 | Gephardt et al. | |
| 5,872,909 A | 2/1999 | Wilner et al. | |
| 5,938,708 A | 8/1999 | Wallace et al. | |
| 5,944,840 A | 8/1999 | Lever | |
| 6,105,048 A | 8/2000 | He | |
| 6,275,916 B1 * | 8/2001 | Weldon et al. | 711/170 |
| 6,279,108 B1 | 8/2001 | Squires et al. | |
| 6,311,327 B1 * | 10/2001 | O'Brien et al. | 717/114 |
| 6,341,303 B1 | 1/2002 | Rhee et al. | |
| 6,349,321 B1 | 2/2002 | Katayama | |
| 6,359,622 B1 | 3/2002 | Hayes-Roth | |
| 6,385,637 B1 | 5/2002 | Peters et al. | |
| 6,385,638 B1 | 5/2002 | Baker-Harvey | |
| 6,425,091 B1 | 7/2002 | Yang et al. | |
| 6,438,573 B1 | 8/2002 | Nilsen | |
| 6,629,113 B1 * | 9/2003 | Lawrence | 707/206 |
| 6,658,652 B1 * | 12/2003 | Alexander et al. | 717/128 |

OTHER PUBLICATIONS

Deshpande, et al., "Viable Control of Hybrid Systems", *Hybrid Systems II*, Springer 1995.

Interrupt Driven Task Scheduler for Systems, *IBM Technical Disclosure Bulletin*, Mar. 1992, US.

* cited by examiner

SYSTEM, METHOD, AND COMPUTER PROGRAM PRODUCT FOR MEMORY MANAGEMENT FOR DEFINING CLASS LISTS AND NODE LISTS FOR ALLOCATION AND DEALLOCATION OF MEMORY BLOCKS

CROSS-REFERENCES TO RELATED APPLICATIONS

This application claims benefit of priority under 35 U.S.C. 119(e) and/or 35 U.S.C. 120 to:

U.S. Provisional Patent Application No. 60/359,453, entitled, "SYSTEM, METHOD, OPERATING MODEL AND COMPUTER PROGRAM PRODUCT FOR OPERATING SYSTEM FUNCTIONS FOR NETWORK PROCESSING", filed Feb. 22, 2002, Marco Zandonadi, et al. inventors;

U.S. Provisional Application, No. 60/376,824, entitled, "SYSTEM, METHOD, OPERATING MODEL AND COMPUTER PROGRAM PRODUCT FOR IMPROVING APPLICATION PERFORMANCE UTILIZING NETWORK PROCESSORS", filed Apr. 29, 2002, Mandeep S. Baines, et al., inventors;

U.S. Provisional Patent Application No. 60/432,778, entitled, "SYSTEM, METHOD, AND COMPUTER PROGRAM PRODUCT FOR MEMORY MANAGEMENT", filed Dec. 11, 2002, Marco Zandonadi, et al. inventors;

U.S. Provisional Patent Application No. 60/432,757, entitled, "SYSTEM, METHOD, AND COMPUTER PROGRAM PRODUCT FOR INTERRUPT SCHEDULING IN PROCESSING COMMUNICATION", filed Dec. 11, 2002, Marco Zandonadi, et al. inventors;

U.S. Provisional Patent Application No. 60/432,954, entitled, "SYSTEM, METHOD, AND COMPUTER PROGRAM PRODUCT FOR PROCESSING REFLECTIVE STATE MACHINES", filed Dec. 11, 2002, Marco Zandonadi, et al. inventors;

U.S. Provisional Patent Application No. 60/432,928, entitled, "SYSTEM, METHOD, AND COMPUTER PROGRAM PRODUCT FOR GENERATING AN INTERFACE", filed Dec. 11, 2002, Marco Zandonadi, et al. inventors;

U.S. Provisional Patent Application No. 60/432,872, entitled, "SYSTEM, METHOD, AND COMPUTER PROGRAM PRODUCT FOR TEMPLATE-BASED MULTI-PROTOCOL MESSAGING BETWEEN SYSTEMS", filed Dec. 11, 2002, Marco Zandonadi, et al. inventors;

U.S. Provisional Application, No. 60/432,785, entitled, "SYSTEM, METHOD, AND COMPUTER PROGRAM PRODUCT FOR SHARED MEMORY QUEUE", filed Dec. 11, 2002, Mandeep S. Baines, et al., inventors; and U.S. Provisional Application, No. 60/433,348, entitled, "SYSTEM, METHOD AND COMPUTER PROGRAM PRODUCT", filed Dec. 12, 2002, Akash R. Deshpande, et al., inventors; each of which applications are incorporated by reference herein.

Other related United States Patent Applications are co-pending U.S. patent application Ser. No. (10/371,681), entitled, "SYSTEM, METHOD, AND COMPUTER PROGRAM PRODUCT FOR INTERRUPT SCHEDULING IN PROCESSING COMMUNICATION", filed Feb. 20, 2003, Marco Zandonadi, et al. inventors; and co-pending U.S. patent application Ser. No. (10/371,829), entitled, "SYSTEM, METHOD, AND COMPUTER PROGRAM PRODUCT FOR PROCESSING REFLECTIVE STATE MACHINES", filed Feb. 20, 2003, Marco Zandonadi, et al. inventors; each of which is hereby incorporated by reference.

FIELD OF THE INVENTION

The present invention relates to the field of memory management and more particularly to class oriented memory management.

BACKGROUND OF THE INVENTION

Many techniques for supporting network processing are known. Such techniques include generic memory management, interrupt scheduling, state machines, computer program code generation, and multi-protocol interfaces. The foundations of such techniques are generally understood but in many cases their practical realization has fallen short of their potential.

Memory management is an important aspect of computer systems and multiprocessor computer systems, and typically includes a process of coordinating and/or controlling the allocation and deallocation of memory. Memory management is generally described as including memory hardware and a memory manager, and is used by any of a variety of applications. The memory hardware may include electronic devices and associated circuitry capable of storing information, such as, RAM (random access memory), MMUs (memory management units), caches, disks, processor registers, and similar storage devices. A variety of applications require memory to function properly.

The applications may request memory allocation, use the memory, and then deallocate the requested memory. Each request is processed by the memory manager coupled to a large pool of memory. The memory manager manages the allocation and deallocation of memory, and processes the application request for allocation and/or deallocation of memory. Unfortunately, applications cannot generally predict in advance how much memory will be required, and the requirement for memory may dynamically change as the application executes.

The memory manager combines two related tasks of allocation and deallocating. Allocation is performed when an application requests a block of memory. The memory manager determines which block memory to allocate based on a list of available blocks. Deallocating memory is performed when a memory block has been allocated and the application indicates the block is no longer required. Alternatively the memory manager or another computer program may determine the allocated memory is no longer required by the application. The memory manager may add the deallocated block of memory back to the pool of available memory making the block of memory available for other allocation requests.

Memory management is a complex task of managing memory so that the application can run efficiently. The design of memory management system is important to the performance of modern computer systems. In fact, memory can be a primary factor of system performance. The memory manager is typically independent from the applications making allocation and deallocation requests and therefore processes individual requests from a number of applications. Consequently the memory manager must perform an analysis including the allocation of available memory based on individual memory allocation and deallocation requests.

Each allocation and subsequent deallocation must then be tracked to ensure the integrity of the memory. Typically, the process of allocating and deallocating memory over time generates memory fragmentation which further complicates the memory management process and degrades the memory managers performance. Memory fragmentation can results in the allocation of non-contiguous memory blocks. Consequently, the performance of current memory managers are unpredictable and are therefore very difficult to use in a multiprocessor system or environment.

In one scenario, an application may make a request for an allocation of memory. The memory manager receives the request, allocates the requested memory, and provides the location of the allocated memory to the requesting application. The application then initializes the memory for use by the application. The initialization may include writing a string of zeros into the allocated memory and/or use some other time consuming initialization process to setup the allocated memory. The application then uses the allocated memory. When the application is finished using the allocated memory, the application may make a request to deallocate the memory previously allocated. The memory manager receives the request and deallocates the corresponding memory. The application may then make a second request for an allocation of memory, and so on, following a similar process. Unfortunately, the application can not make any assumptions concerning the allocated memory and must typically reinitialize any allocated memory. Consequently, any previous initialization that may have been performed in conjunction with the same memory location is repeated. Unfortunately, memory managers lack support for minimizing unnecessary initialization of allocated memory, such as for example, re-initialization of a memory location that was previously initialized and deallocated.

There are generally two approaches to recycling memory: either the computer programmer must decide when memory may be reused (known as manual memory management); or the memory manager must decide (known as automatic memory management). Manual memory management requires the application computer programmer to control when and how memory is recycled. Usually this is either by explicit calls to memory management functions, such as a so-called malloc command (allocate) and a so-called free command (deallocate) in the C computer programming language. The key feature of a manual memory manager is that memory is not recycled without instructions from the application to recycle the memory. One advantage of this approach is that is typically easier for the application computer programmer to understand how memory is allocated and recycled. Unfortunately the application computer programmer is required to write a considerable amount of computer program code or computer program instructions to manage the memory used by the application. Further the computer program instructions written for managing the memory typically require verification and debugging. Some computer programming languages primarily use this type of manual memory management, such as for example C, C++, Assembly, Fortran, and Pascal. Unfortunately, this approach increases the complexity of computer programming by an order of magnitude and detracts from the computer programmers focus on the objectives of the application.

Automatic memory management is an alternative approach that may be provided as part of a computer programming language and/or computer programming language extension for automatically recycling memory that an application computer program would not otherwise use again. Automatic memory managers, such as a so-called garbage collector, usually recycle memory blocks that are unreachable by the application computer program. For example a pointer to an allocated memory block may be provided to an application. If the application deletes the pointer then the memory management function can determine the memory block is no longer accessible to the application and therefore may be added to pool of available memory. Advantageously, the application computer programmer can focus on the actual computer program rather than focusing on managing memory. Unfortunately, keeping track of accessible memory blocks typically requires a considerable amount of computational overhead. Some computer programming languages use automatic memory management, such as for example, Java™, JavaScript™, Lisp, and other languages as are known in the art and their equivalents.

Unfortunately, both the manual and automatic approaches to memory management suffer from potential memory fragmentation, unpredictable allocation and deallocation performance, and a lack of support for minimizing the re-initialization of memory.

Therefore conventional memory managers are not efficient and there remains a need for a system, method, computer program, and computer program product for memory management that reduces potential memory fragmentation, performs allocation and deallocation according to a predictable performance, and provides support for minimizing the re-initialization of memory. What is needed is an ability to provide memory management that overcomes the above and other disadvantages of known network processors.

BRIEF SUMMARY OF THE INVENTION

In summary, one aspect of the present invention is directed to a method including configuring a first memory including allocating at least one node; and defining a status including: defining a class list, wherein each node is capable of storing a class instance corresponding to a class selected from said class list; and defining a node list to identify an allocation status of each node including an available status, and an allocated status; receiving an allocation request including a class identifier, responding to the allocation request with a node identifier representing said available node and updating the available node allocation status; otherwise responding with a failure indication; and receiving a deallocation request and responding to said deallocation request by updating the allocation status to the available status. A system, router, computer program and computer program product are also disclosed.

The system, method, and computer program product for memory management of the present invention has other features and advantages which will be apparent from or are set forth in more detail in the accompanying drawings, which are incorporated in and form a part of this specification, and the following Detailed Description, which together serve to explain the principles of the present invention.

DETAILED DESCRIPTION

Reference will now be made in detail to embodiments of the invention, examples of which are illustrated in the accompanying drawings. While the invention will be described in conjunction with several embodiments, it will be understood that they are not intended to limit the invention to those embodiments. On the contrary, the invention is intended to cover alternatives, modifications and equivalents, which may be included within the spirit and scope of the invention as defined by the appended claims.

The present invention provides innovative operating system techniques for network processing designed and implemented for network processors. In many conventional implementations, network processors are multiprocessor system-on-chip components optimized for packet input-output and modification. Network processors typically include a tightly coupled multiprocessor architecture. Advantageously, the present invention is capable of enhancing packet throughput and minimizing latency through the use of novel computer program software techniques for common operating system functions, and associated architectures and operating system methodologies, according to an embodiment of the present invention.

Several of the inventive systems, methods, and computer program products for processing memory management may be implemented for use with network processor (NP) platforms, such as for example in a Teja Network Processor platform. References to "Teja" are references to particular embodiments, computer programming code segments, or other references to subject matter developed by Teja Technologies of San Jose, Calif.

Figure 1:
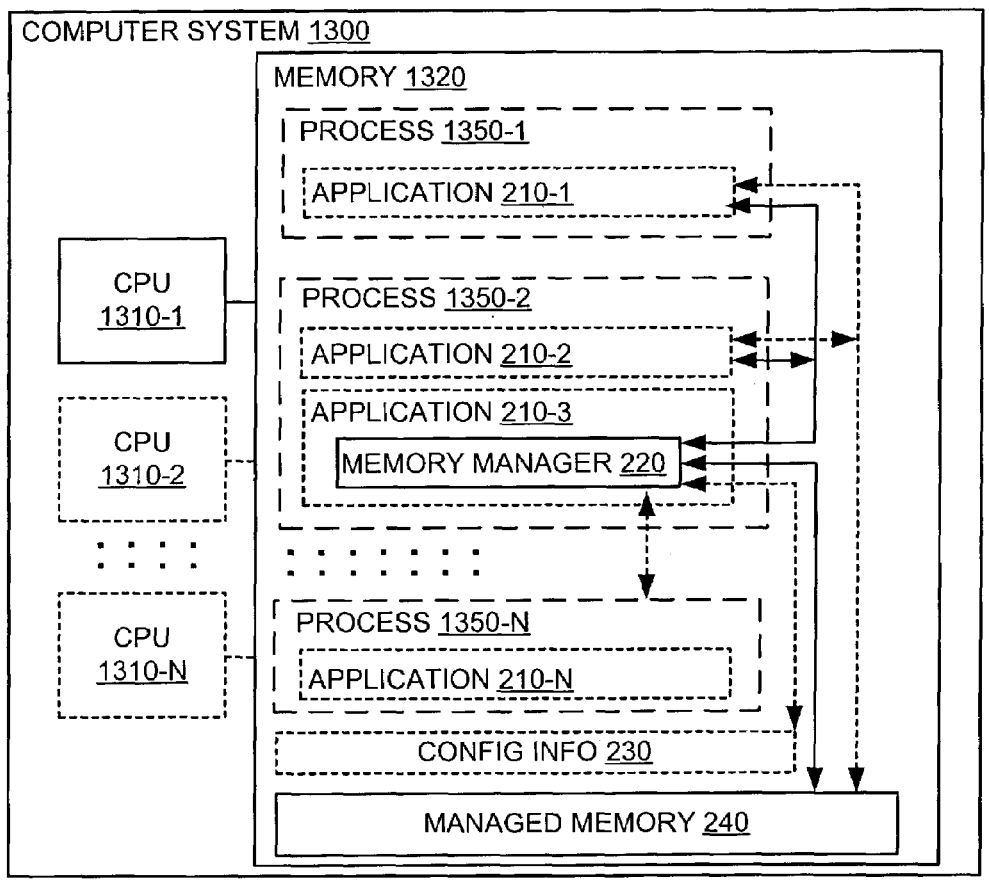
FIG. 1 generally illustrates a computer system, according to an embodiment of the present invention.

Turning now to the drawings, wherein like components are designated by like reference numerals throughout the various figures, attention is directed to FIG. 1 illustrating an exemplary memory management system for managing memory according to one embodiment of the present invention. The embodiment may include a computer system 1300, a CPU 1310, memory 1320, a memory manager 220, configuration information 230, and managed memory 240. A CPU 1310-x, such as for example CPU 1310-1, 1310-2, . . . , 1310-N, is typically coupled with memory 1320 for processing one or more processes 1350-x, such as for example processes 1350-1, 1350-2, . . . , 1350-N. The process 1350-x may be coupled with one or more applications 210-x, such as for example applications 210-1, 210-2, 210-3, . . . , 210-N. The memory manager 220 may be coupled with an application, such as for example application 210-3. Alternatively, the memory manager 220 may be a separate application. The memory manager 220 may interact with other applications, such as for example application 210-1 and 210-2. The memory manager 220 may be coupled with a process 1350-x for execution in conjunction with a CPU 1310-x. The memory manager 220 may be coupled with configuration information 230, and a managed memory 240. The memory manager 220 typically configures managed memory 240 and supports allocation and deallocation of memory blocks.

Figure 2:
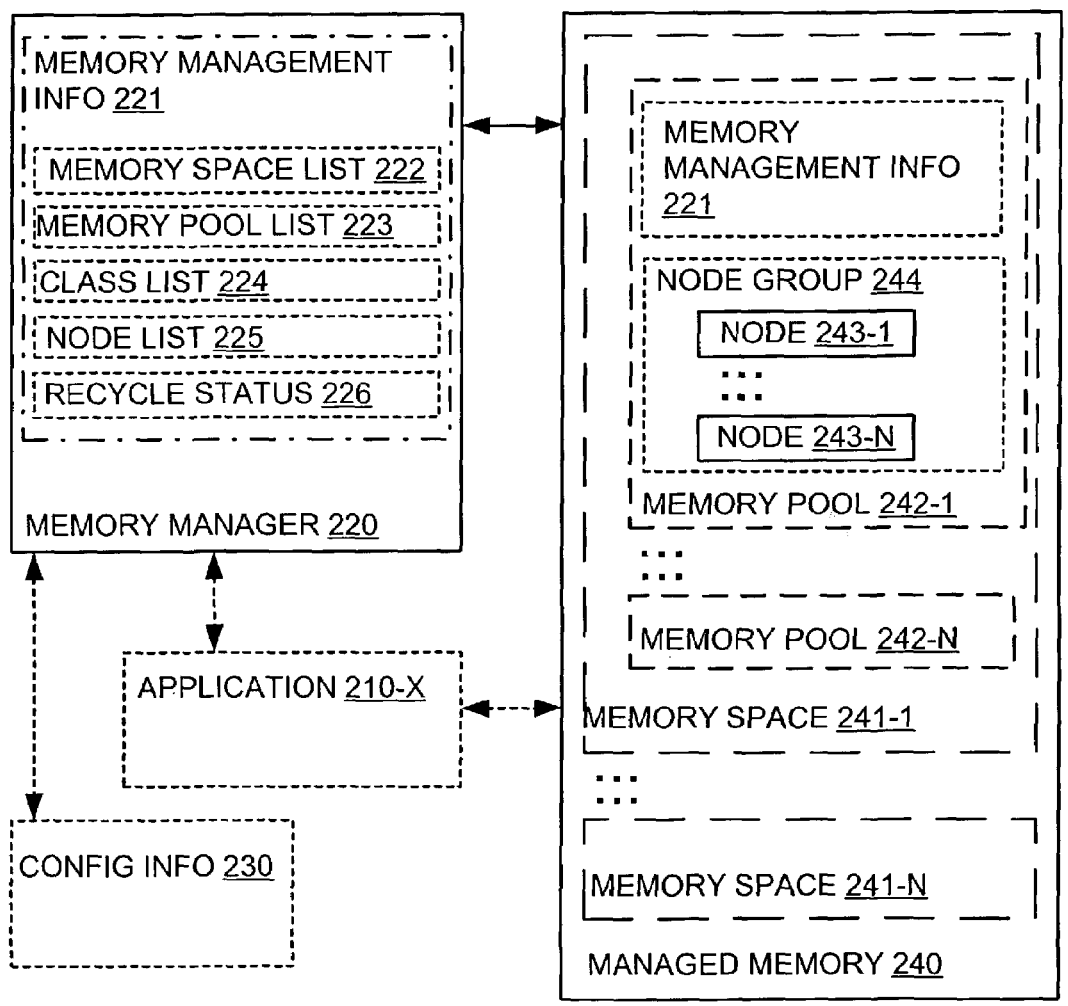
FIG. 2 generally illustrates a memory manager and managed memory, according to an embodiment of the present invention.

FIG. 2 generally illustrates an object based memory management system including an optional application 210-x, memory manager 220, managed memory 240, and optional configuration information 230. The managed memory 240 may be segmented according to a variety of schemes. As depicted the managed memory 240 is segmented into at least one memory space 241-x. The memory space 241-1 may further be segmented into one or more memory pools 242-1, . . . , 242-N. A memory pool, such as 242-1, may further be segmented into one or more nodes 243-1, . . . , 243-N, and/or a node group 244. Alternatively, a number of different approaches for segmenting memory may be used.

A number of individual nodes 243-x may be configured into groups, such as for example, the node group 244, to support the allocation and deallocation of the blocks, such as class instances. The memory pool 242 may be associated with a class list 224, a node list 225, and each node 243-x of the node group 244 may be associated with a recycle status 226. The class list 224 may be used to identify one or more class that may be stored in any one of the nodes 243-x, corresponding with the node group 244. The node list 225 may be used to identify allocated, deallocated, and/or available nodes coupled with the memory pool 242.

A class typically functions as a template for creating individual instances of the class, accordingly the size of each class instance is the same, and the class instance size may be determined by evaluating the class. Class list 224 typically identifies one or more classes that may be instantiated and/or stored in a node 243-x coupled with the node group 244. The memory required to instantiate an instance of a class in the class list 224 may be evaluated to determine the smallest amount of memory required to instantiate any class in the class list 224. Each node 243-x in the node group should be capable of storing an instance of any class identified in the corresponding class list 224. According to one embodiment, each node 243-x is of a uniform size. The node list 225 and class list 224 may be managed as a linked list, or according to other implementations known in the art.

A class list 224 identifying a single class may reduce allocation, deallocation, and initialization time because only instantiations of the same class are allocated within the memory pool. Consequently, the class instance structure and class instance initialization is typically the same for each memory block. The memory manager may maintain additional information associated with the allocation and deallocation of memory blocks. In particular, the memory manager may include status information to indicate if a memory block was previously allocated and deallocated. The recycle status 226, coupled with a node 243-x, may be used to provide this status information in response to an allocation request.

If the memory manager allocates the node 243-x for a class instance corresponding to a class in the class list 224 then the recycle status 226 may be used to indicate that the node has been recycled. The node is recycled if (1) the node 243-x is associated with a class list identifying a single class and (2) the node 243-x has been allocated previously and subsequently deallocated. A recycled status may be advantageously provided to minimize initialization associated with allocating a second class instance coupled with the same node 243-x. Consequently, the application requesting the allocation may make some assumptions based on the recycle status to minimize initialization and/or instantiation of the second class instance coupled with the same node 243-x.

Each node within the node group 244 may be used to store an instance of a class identified in the corresponding class list 224. The node list 225 may be used to identify a node group 244 and/or nodes 243-x. The node list 225 may include a list identifying one or more node groups 244 and may include another list identify nodes 243-x that have been coupled with class instances.

A recycle status 226 may be associated with a node 243-x to indicate that the node was coupled with a class instance, and then the node 243-x was decoupled from the class instance. Some information typically remains with the decoupled node 243-x such that subsequent instantiations may take advantage of this information. The recycle status 226 may be used by the memory manager 220 and/or an application 210-x to optimize allocation of the node 243-x as a similar class instance. Advantageously, the recycle status 226 information may be used by the application that instantiates a class instance and thereby helps eliminate certain processing that was previously performed in conjunction with a prior class instantiation utilizing the same node 243-x. Advantageously, the subsequent class instantiation may be optimized to reduce some of the overhead previously performed in conjunction with the initial class instantiation.

The memory manager 220 may be used to couple a node 243-x in the managed memory 240 with class instances or object, and may communicate with an application 210 and may use configuration information 230. The information 221 may be used to facilitate application 210-x requests, including configuring, allocating, and deallocating the managed memory 240. The memory management information 221, which may include a memory space list 222, memory pool list 223, class list 224, node list 225, recycle status 226, and additional information that may be used to support memory management and/or application requests. Beneficially, the memory manager may initially allocate a node 243-x or a group of nodes 243-1, . . . , 243-N, once and then manage application allocation and deallocation requests without actually deallocating or reallocating the initially allocated node or group of nodes. Advantageously, the complexity of the memory manager 220 may be reduced.

Configuration information 230 may be used by the memory manager 220 to configure the managed memory 240 and/or to store the present configuration of the managed memory 240. Configuration information 230 may describe a memory space 241-x, a memory pool 242-x, a node 243-x, a node group 244, a class list 224, a node list 225, a recycle status 226, other information describing the memory, and/or any other information coupled with the memory manager. Configuration information 230 may also be used by the memory manager 220 to configure or initialize the managed memory 240. Accordingly, the managed memory 240 may be configured in a variety of way to support the present invention.

An application 210 may interact with the memory manager 220 to allocate and to deallocate class instances, and to configure or reconfigure the managed memory 240. Applications typically request memory allocation and memory deallocation in conjunction with the instantiation and subsequent freeing a class instance. Advantageously, the memory manager 220 can reply to an application allocation request by coupling an available node with the allocation request thereby reducing processing associated with memory allocation and potential fragmentation issues of conventional memory managers. The memory manager 220 can reply to an application deallocation request by indicating the associated nodes availability in a node list 225 without actually deallocating the memory.

Figure 3:
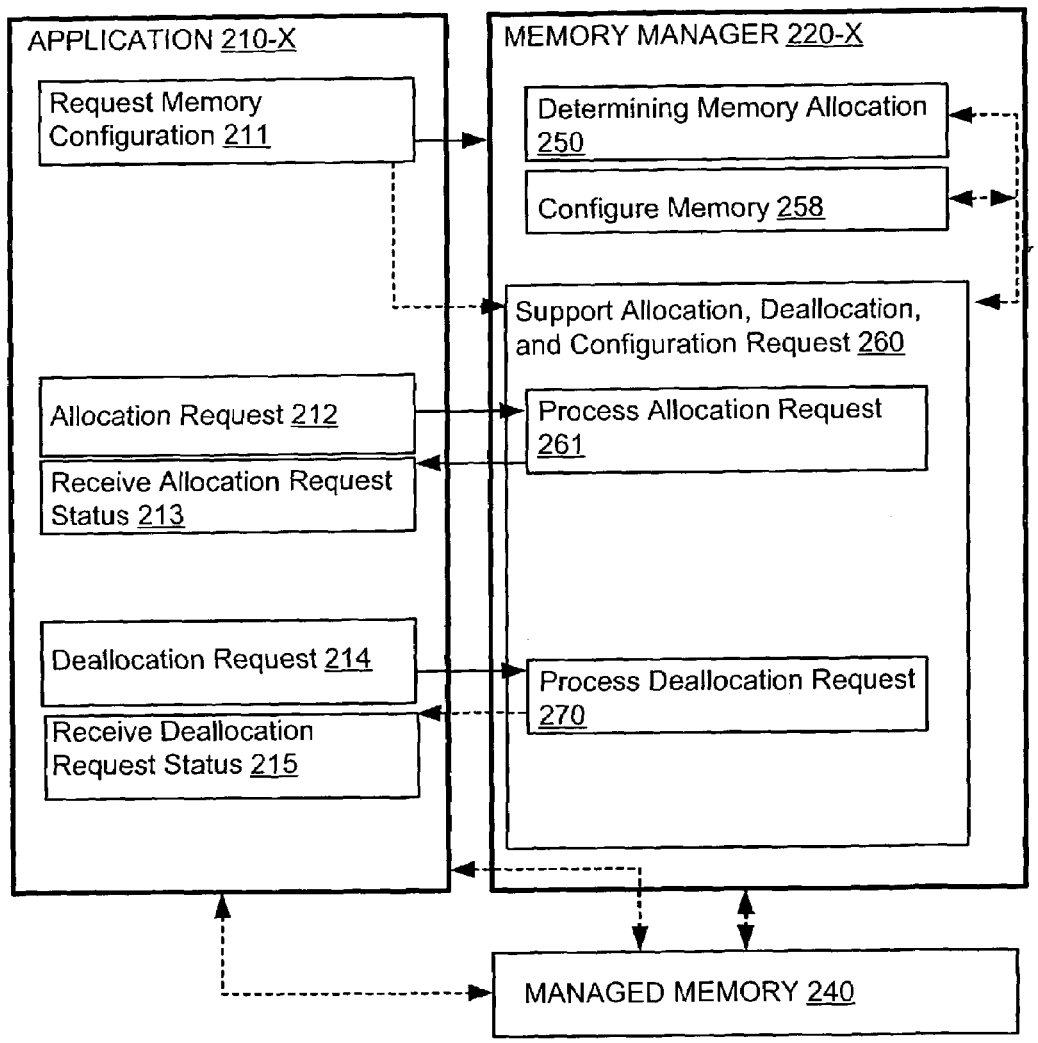
FIG. 3 generally illustrates an application and a memory manager, according to an embodiment of the present invention.

FIG. 3 generally illustrates the interaction between an application 210-x and a memory manager 220-x, according to an embodiment of the present invention. The application 210-x may request memory configuration at 211 that is sent to the memory manager 220-x. The memory manager 220-x then determines the memory allocation at 250, configures memory at 258, and/or support further interaction including allocation, deallocation, and configuration requests at 260. According to one embodiment, the application 210-x may perform an allocation request at 212 that is sent to the memory manager 220-x for processing the request at 261. The application 210-x may then receive the allocation request status at 213. According to another embodiment, the application 210-x may perform a deallocation request at 214 that is sent to the memory manager 220-x for processing the request at 270. The application 210-x may then receive the allocation request status at 215. The memory manager 220-x is typically coupled with the managed memory 240. The application 200-x may optionally be coupled with the managed memory 240.

Figure 4:
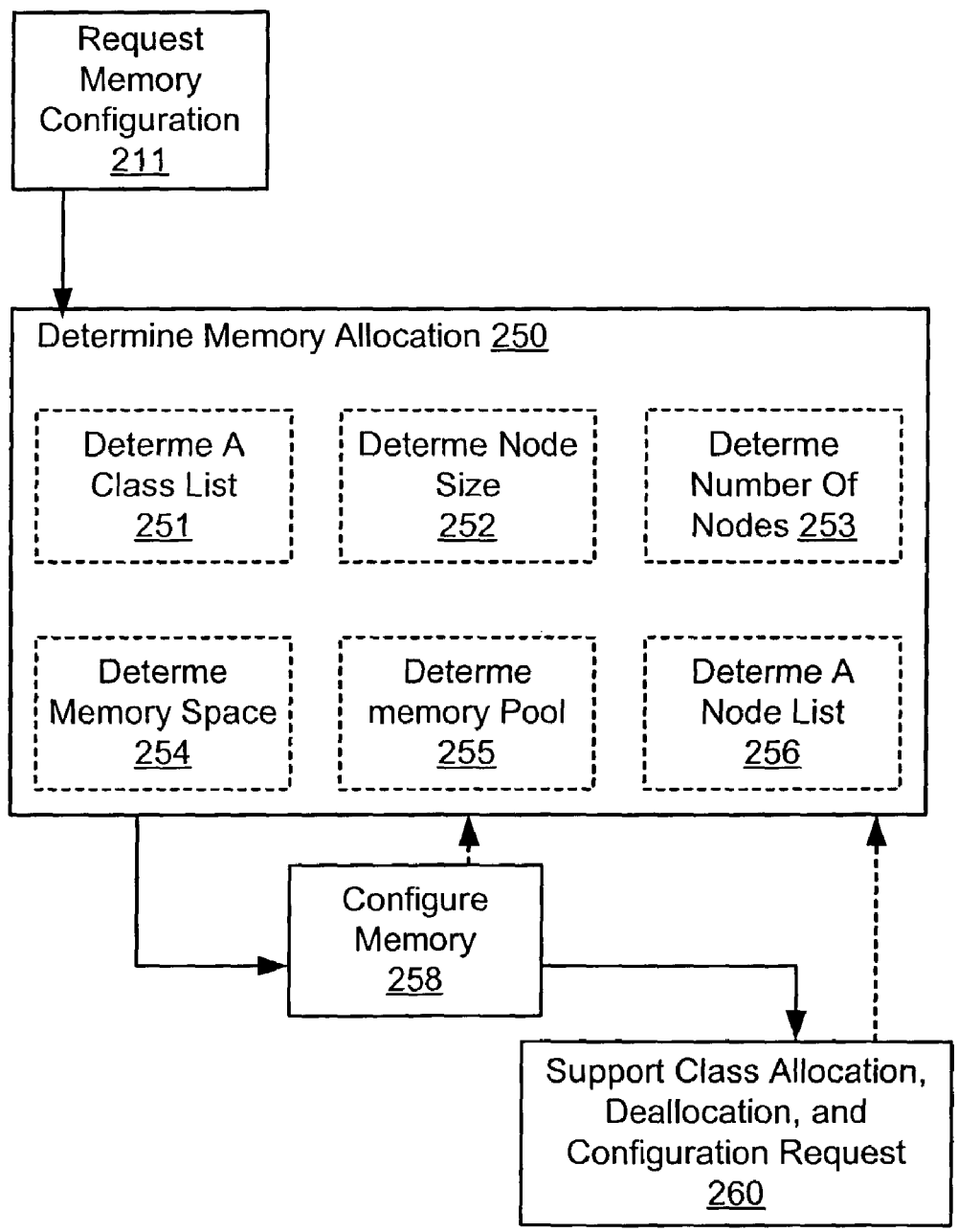
FIG. 4 generally illustrates configuring memory, according to an embodiment of the present invention.

FIG. 4 generally illustrates determining memory allocation at 250 based on a requested memory configuration at 211. According to one embodiment, the request at 211 may be generated by an application 210, by a startup procedure, or by the memory manager 220. The request 211 may include or identify configuration information 230. The configuration information may be used in allocating the managed memory 240 and/or information. As example, the configuration information may include memory management information 221, class list 224, node list 225, and/or recycle status 226. Typically, the memory manager supports requests for allocation and deallocation using the managed memory 240 after the memory allocation is determined at 250 and the memory is configuring at 258.

The request 211 may include one or more class identifier, class instance size, number of nodes, size of nodes, number of memory pools, size of memory pool, number of memory spaces, size of memory space, and/or other information pertinent to configuring the managed memory 240 and/or the memory manager 220. Determining a class list at 251 may be based on default information or information included in the request at 211 such as the class identifier. Determining the node size at 252 may be based on default information or information included in the request at 211 including the class identifier and class instance size. Determining the number of nodes at 253 may be based on the node size determined at 252, the managed memory 240 available, a default value, or information included in the request at 211. Defining a memory pool at 255 may be based on the number of nodes at 253, the node size at 252, the default information, or information included in the request at 211. Determining a memory space at 254 may be based on the number of memory pools determined at 255, default information, or information included in the request at 211. Defining the node list at 256 may be based on the number of nodes at 253, managed memory 240, default information, or information included in the request at 211. The memory may be structured as depicted in FIG. 2 or alternatively, according to a number of other approaches for allocating memory. After determining the memory allocation at 250, the managed memory 240 may be configured at 258. Alternatively, the managed memory 240 may be configured 258 interactively with determining memory allocation at 250, such as configuring one memory pool and associated information and then configuring another memory pool. Typically the memory manager 220 provides support for class allocation requests at 212, class deallocation requests at 214, and/or may also provide support for request memory configuration at 211 after the memory is configured at 258.

Memory managed by the memory manager 220, may be configured at design time. Alternatively, users or applications 210 can interactively configure the memory layout at run time including at least memory spaces 241-x, memory pools 242-x, class list 224, and a node 243-x by interacting with the memory manager, such as for example using a graphical user interface. An interactive configuration can facilitate system analysis and design. The resulting memory configuration may be stored with a system utilizing the memory manager, such as for example in compiled computer program code, an executable file, and/or as configuration information 230. At system startup and/or at memory manager 220 startup, the managed memory 240 may be configured according to a stored configuration.

The memory manager 220 may initially allocate a number of memory spaces 241-x and memory pools 242-x, each memory pool is typically coupled with a node group such as 243-1, . . . , 243-N. Memory spaces 241-x can contain static instances of object classes and memory pools 242-x. A memory pool 242-x may represent a group of created memory nodes 243 according to user interaction or a specific configuration. The memory manger may create a number of nodes coupled with a memory pool based on information provided by an application, such as the number of nodes, node sizes, and class list.

The efficiency of the memory manager typically provides a maximum time to allocate a new memory node according to $O(\log(k)*\log(h))$, which is a constant: k is the number of memory nodes 243-x and h is the maximum number of memory pools 242-x in a memory space 241-x. Both the number of memory nodes 243-x and memory pools 242-x may be defined at design time in the system architecture.

Figure 5:
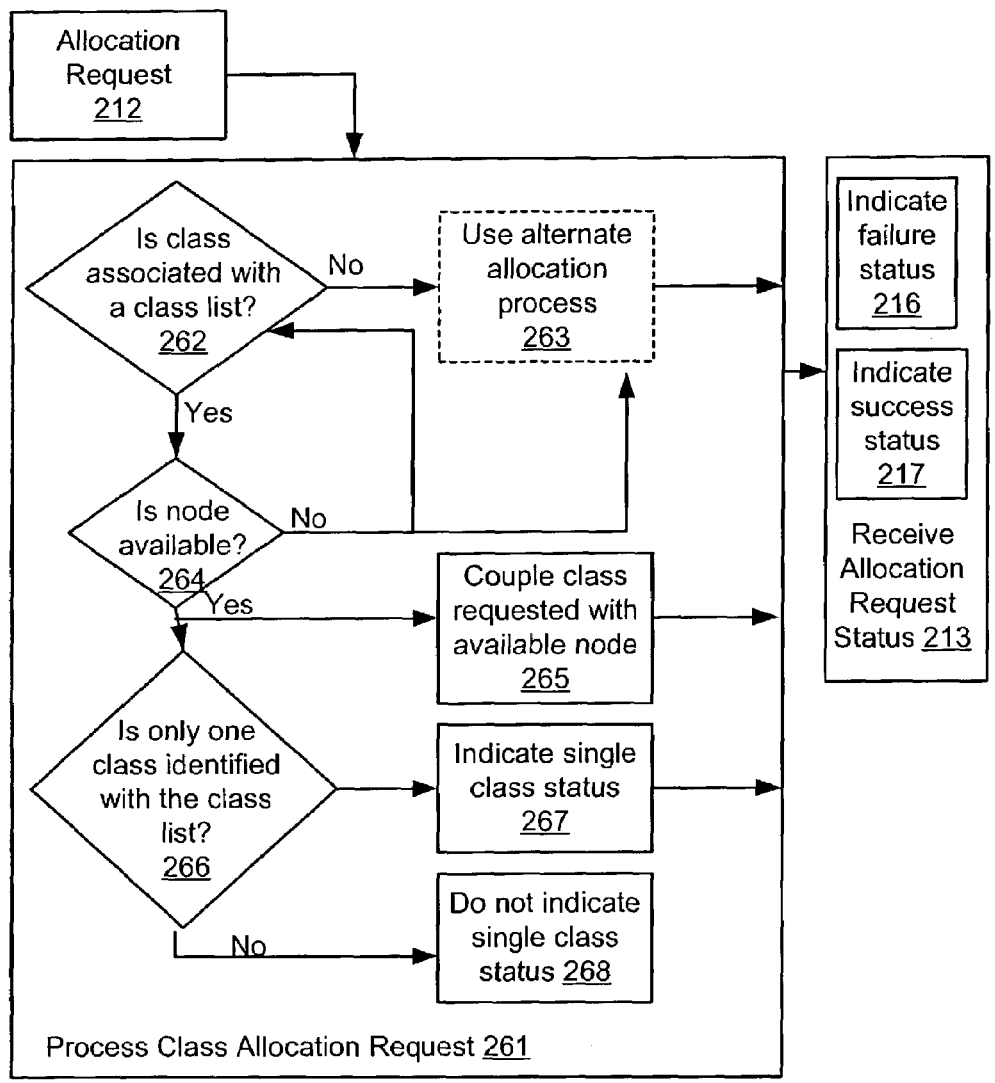
FIG. 5 generally illustrates processing an allocation request, according to an embodiment of the present invention.

FIG. 5 generally illustrates an allocation request at 212 that is processed at 261. According to one embodiment of the present invention, an application 210 may generate a class allocation request at 212. The memory manager 220 may process the request at 261 and may reply to the request with a status 213. The request at 212 typically includes a class identifier. The memory manager 220 may first determine if the class identifier is associated with a corresponding class list at 262. If the class identifier is not associated with a class list then an alternate allocation process at 263 may be used. If the class identifier is associated with a class list, then the node list corresponding to the class list is checked to determine if a node is available 264. If a node is not available then an alternate allocation process at 263 may be used, or another corresponding class list may be evaluated at 262. If a node is available then the class allocation request at 212 may be coupled with the available node at 265. If only one class is identified by the class list at 266 then the single class status at 267 may be communicated in response to the request at 212, otherwise the single class status is not communicated at 268. As depicted, the request status 213 may be communicated in response to the allocation request at 212 and may include a failure status at 216 or a success status at 217. Failure status may occur when memory was not coupled with the request at 213. Success status may occur when memory was coupled with the request at 213, and may include a reference pointer to the memory coupled with the request at 212.

Figure 6:
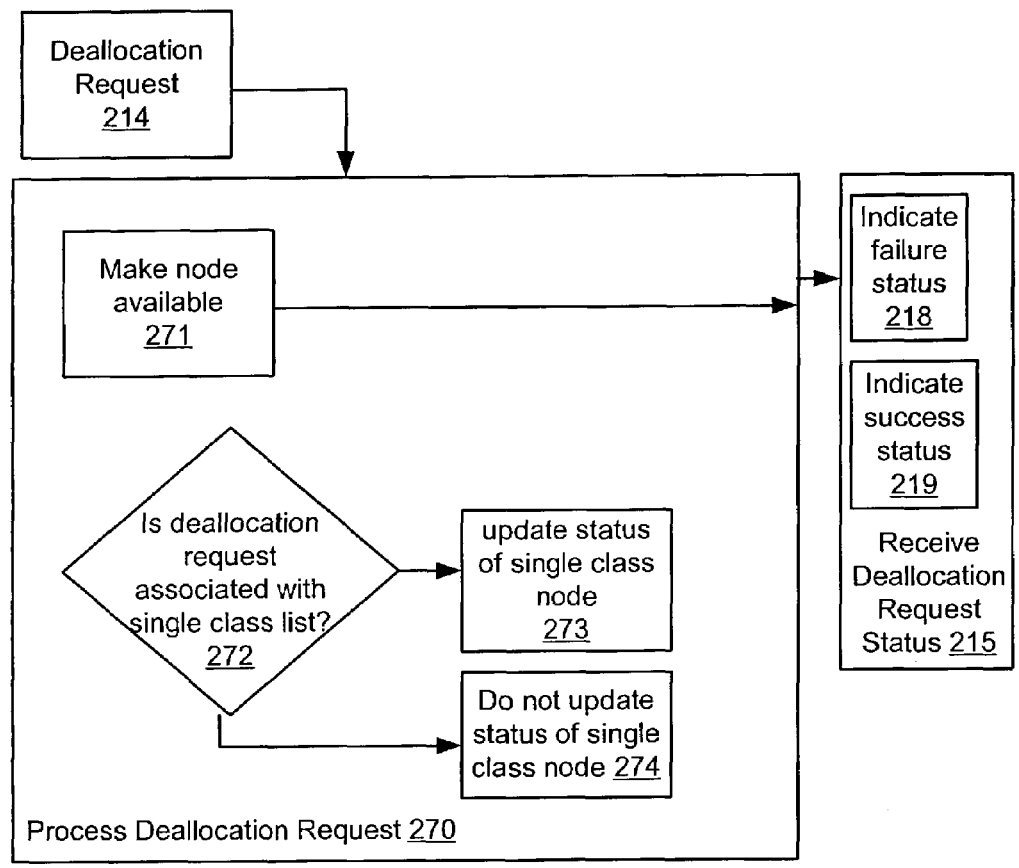
FIG. 6 generally illustrates processing a deallocation request, according to an embodiment of the present invention.

FIG. 6 generally illustrates a deallocation request at 214 processed at 270. An application 210 may generate the deallocation request at 214. The memory manager 220 may process the request at 270, and may reply with a request status 215. The request typically includes a class instance identifier. The memory manager 220 may verify the identified class instance is coupled to a node 243-x and then make the node available at 271. Information may be added and/or updated in the node list 225 to indicate the node that was coupled with a class instance at 271. If the node 243-x is associated with a class list identifying a single class at 272 then the recycle status 226 corresponding to the node 243-x made available at 271 may be updated at 273, otherwise further updating of the recycle status 226 is not required at 274. The request status 215 may include a failure status at 218 or a success status 219. Failure status 218 may occur if the allocation process fails. Success status may occur when the node 243-x was decoupled with the class instance identified by the request at 214.

According to one embodiment, a memory pool and/or a node group that is associated with a class list, which identifies a single class, may be further optimized. When an instance is allocated from a single class memory pool then the user may skip part or all of the constructor initialization. If the node has not been recycled then the instantiation and initialization are performed. A recycle status 226 may be associated with each node 243-x, with each node 243-x corresponding to a node group, and/or with each node 243-x corresponding to a memory pool. Advantageously, the memory manager provides the ability to recycle objects such that complex constructor resource allocation may be performed once.

Pseudocode illustrating several recycle functions for one particular embodiment of a Teja based memory manager is located below in Table 1 by way of illustration and not by way of limitation.

Pseudocode illustrating the usage of the recycle functions for one particular embodiment of a Teja based memory manager is located below in Table 2 by way of illustration and not by way of limitation.

TABLE 1

Example Recycle Functions

TejaAux_is_recycled( ): this function returns 1 if the object has been obtained from a single class memory pool more than once.
TejaAux_is_recyclable( ): this function returns 1 if the object comes from a single class memory pool.

TABLE 2

Example Usage of Recycle Functions

```
/* constructor code */
. . .
if (!TejaAux_is_recycled (aux))
/* perform complex resource allocation: this branch of the "if" will be
executed only once if aux comes from a single class memory pool */
. . .
/* destructor code */
. . .
if (!TejaAux_is_recyclable (aux))
/* perform complex resource deallocation: this branch of the "if" will be
executed only if aux comes from a single class memory pool, otherwise it
won't be executed at all */
. . .
```

Accordingly, the <Class>_new ( ) allocation functions set the recycle bit in the allocated instance to 1 after calling the constructor. Similarly <Class>_delete ( ) functions zero the recycle bit after calling the destructor only if the instance comes from a multi-class memory pool.

The memory manager 220 may provide a class-oriented approach to the allocation and deallocation of managed memory 240 which further supports high-performance processor applications while remaining independent of any specific architecture or operating system. The memory manager 220 awareness of application classes 224-x and memory pools 242-x supports an improved performance, recycling class instances, and minimizes memory fragmentation. Dynamic allocation may be performed once and thereby minimize overhead corresponding to the allocation and deallocation of class instances. As an example, malloc( ) command (allocate) is ideally only called by the memory manager 220 during system startup, and free( ) command (deallocate) is ideally only called by the memory manager 220 at system shutdown.

For efficiency, memory may be partitioned into memory spaces 241-x and memory pools 242-x. Where a memory space 241-x is a region of memory which can contain instances of classes and any number of memory pools 242-x. The memory pool 242-x may be associated with one or more class list 224 and may include a set of preallocated memory nodes 243-x, which represent a block of memory for use by a computer programmer or application 210. The size of the memory nodes 243-x associated with a memory pool 242-x is typically the same, and represents the size of the largest class in the associated class list 224 and/or a numeric value provided by a user. A user may include a computer programmer, a computer program, a system, and/or an application 210. Segmenting the memory accordingly by a user, designer, or as part of a startup procedure (such as boot strapping) will make memory allocation and deallocation more efficient because the memory manager 220 is aware of application requirements. Consequently, the innovative memory manager 220 does not require a complex free list management algorithms, such as for example malloc( ) and free( ).

Figure 7:
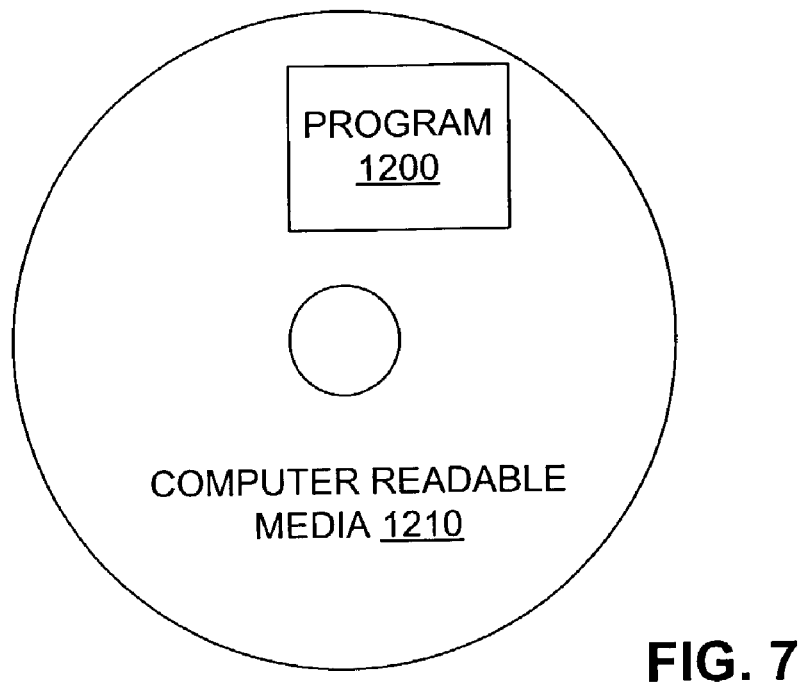
FIG. 7 illustrates a method implemented on a computer readable media, according to an embodiment of the present invention.

FIG. 7 illustrates an exemplary method according to the present invention on a computer readable media 1210. A computer program 1200 represents at least one of the methods described herein, such as for example a memory manager 220. The computer program 1200 is coupled with or stored in a computer readable media 1210, such that a computer system can read and execute the computer program 1200.

Figure 8:
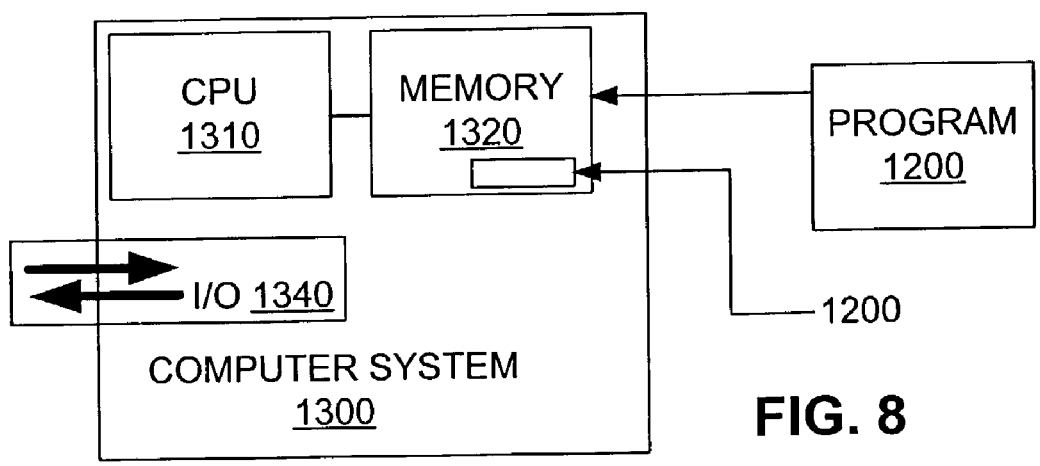
FIG. 8 illustrates an embodiment of a method executed by a computer system, according to an embodiment of the present invention.

FIG. 8 illustrates an exemplary computer system 1300 including at least one processor or central processing unit (CPU) 1310, a memory 1320 coupled to the CPU 1310, and support for input and output 1340. The computer program 1200 may be loaded into a memory 1320 accessible to the computer system 1300, which is capable of executing the computer program 1200. Alternatively, the computer program 1200 may be permanently embedded in the memory 1320. The support for input and output 1340 typically interacts with the computer program 1200.

According to one embodiment, A memory management system provides a memory allocation/deallocation service where the allocation, instead of being a function of an allocation size typical of other memory managers, is function of an identifier that identifies an object (such as for example, without limitation, an object oriented class) and one or more memory identifiers. The memory identifier may represent a memory pool corresponding with a set of nodes and a set of class identifiers. Upon an allocation request, the memory manager returns a node capable of storing the object. As an example, the class instance may be stored and/or instantiated in the memory area identified by the node. The memory manager typically maintains a list tracking the status and/or history of each node. If a node is not available then a failure indication may be generated in response to the request. The failure indication may be represented as a NULL value.

If an allocation request succeeds, requestor usually performs an initialization of at least part of the memory identified by the node. As an example, a computer program may make the allocation request for enough memory in which to instantiate a computer programming structure, such as an objected oriented class. Typically, an allocation request is followed with an initialization activity. The initialization activity may include the allocation additional memory and/or different resources.

Once the requestor does not require the memory corresponding to the node, then the memory may be released and subsequently reused in processing a subsequent allocation request. The requestor may return the memory to the memory manager using a function call with the node identifier. The memory manager can update the status and/or history of the memory, and subsequently allocate the memory to another requestor. Placing the node back into the corresponding memory pool. Prior to returning the node to the memory manager, the application may execute some computer program code (such as for example, without limitation, computer program clean-up code) to free or deallocate any additional resources that may have been coupled with an object stored in the memory identified by the node during its initialization and/or utilization.

According to one embodiment, nodes can be allocated from a memory pool associated with a single computer programming class. Preferably, the class is recyclable, such that the effort typically required to allocated memory and instantiate a class is reduced for a second instance of the same or similar class. A recycle status may be communicated is response to an allocation request. A recycled status can be used to indicate that the memory corresponding to the node identifier was used for the allocation of a previous instance of the same class. The requester can check to determine if the allocated node is recyclable. The requestor may also check to determine if the node has been recycled (such as, for example, previously allocated and deallocated) or if the node has not been recycled (such as; for example, the memory corresponding to the node identifier has not been previously allocated). At clean-up time, if a node is recyclable but not recycled, the clean-up logic may perform a limited clean-up. A limited clean-up may result in not freeing one or more resource that may have been coupled with the object stored in the memory area identified by the node. Advantageously, the required effort to allocate and initialize a subsequent object is reduced. The subsequent allocation and initialization may be limited in part because a previous allocation and initialization is know to have been performed. An initialization process may include two or more different aspects that can be related to the what information was previously initialized. When the memory corresponding to the same node is be reallocated, the initialization code can verify the recyclable status and/or recycled status, and possibly skip initialization code that is typically required to initialize the memory identified by the node identifier and/or other resources that are still coupled with the previously deallocated node identifier that were not freed from a previous allocation.

According to one embodiment, computer program applications execute faster by minimizing allocation and deallocation processing and/or minimizing processing associated with memory fragmentation. Minimizing the overall amount of processing performed by a computer program application for the allocation and deallocation of computer program objects may be reduced by eliminating redundant process. Redundant processing may be eliminated and/or reduced in the allocation, initialization, and/or deallocation of computer programming objects. Allocating a memory area for use in the allocation and deallocation of a number of similarly sized object may reduces memory fragmentation that typically results from cyclical allocation and deallocation of memory blocks having varying sizes. Fragmentation would also reduced by a reduction in the total number of allocations and deallocations, in part through the allocation and managing of larger blocks of memory, such as for example a memory pool.

In many respects the modifications of the various figures resemble those of preceding modifications and the same reference numerals followed by subscripts a, b, c, d, e, f, g, h, i and j designate corresponding parts.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the claims appended hereto and their equivalents.

What is claimed is:

1. A method of memory management to support allocation and deallocation of at least one memory, said method comprising:
   (A) configuring a first memory selected from said at least one memory, said configuring including allocating at least one node in said first memory; and defining a status including:
      defining a class list to identify at least one class, wherein each node of said at least one node is capable of storing a class instance corresponding to a class selected from said class list; and
      defining a node list to identify an allocation status of said at least one node, said allocation status is selected from a group of first statuses comprising: an available status and an allocated status;
   (B) receiving an allocation request including a class identifier;
   (C) responding to said allocation request with a node identifier representing said available node and updating said available node allocation status to said allocated status if said class identifier is identified in said class list and said node list identifies an available node selected from said at least one node having said available status;
   (D) otherwise responding to said allocation request with a failure indication;
   (E) receiving a deallocation request including a release node identifier representing a release node selected from said at least one node; and
   (F) responding to said deallocation request by updating said release node allocation status to said available status.

2. The method of claim 1, wherein said status further comprises defining a recycle list to identify a recycle status for each of said at least one node, said recycle status is selected from a group of second statuses comprising a previous allocated status and a new status;
   said responding to said allocation request with a node identifier at (C) further includes said recycle status corresponding with said node identifier; and
   said responding to said deallocation request at (F) further comprises updating said node recycle status, corresponding with said release node, to said previous allocated status.

3. The method of claim 2, wherein said class list identifies one class.

4. The method of claim 3, wherein said previous allocated status indicates a normal instantiation of a class instance may be reduced.

5. The method of claim 1, wherein said class list identifies one class, and said status further comprises a recycle list to identify a recycle status for each of said at least one node, said recycle status is selected from a group of second statuses comprising: (i) a previous allocated, status to indicate instantiation has occurred, (ii) a partial allocated status to indicate a partial instantiation has occurred, and (iii) a new status to indicate instantiation is required.

6. The method of claim 5, wherein said responding to said allocation request with a node identifier at (C) further includes responding with said recycle status; and said responding to said deallocation request at (F) further comprises updating said recycle status, corresponding with said release node, to said previous allocated status.

7. The method of claim 6, further comprising recycling a node selected from said at least one node comprising:
   (a) receiving a first allocation request at (B) and responding at (C) with said node identifier;
   (b) receiving a first deallocation request at (E) and responding at (F), wherein said release node identifier corresponds with said node identifier at (a); and
   (c) receiving a second allocation request at (B) and responding at (C) with said node identifier corresponds with said node identifier at (a).

8. The method of claim 1, wherein said configuring at (A) comprises:
   configuring a memory pool in said first memory including allocating at least one node in said memory pool; and defining a status including:
      defining a class list to identify at least one class, wherein each node of said at least one node is capable of storing a class identified by said class list; and
      defining a node list to identify an allocation status of said at least one node, said allocation status is selected from a group of statuses comprising: an available status and an allocated status.

9. The method of claim 8, wherein said allocating at least one node in said memory pool further comprises:
   (a) allocating at least one memory space in said first memory; and (b) allocating at least one memory pool in said memory space.

10. A memory management system to manage allocation and deallocation of at least one memory, said system comprising:
   a storage structure including a first memory selected from said at least one memory;

a configuration manager, coupled to said storage structure, to receive a configuration and to configure a first memory selected from said at least one memory, said configuration including allocation of at least one node in said first memory; and to define a status in said storage structure including:
  to define a class list in said storage structure to identify at least one class, wherein each node of said at least one node is capable of storing a class instance corresponding to a class selected from said class list; and
  to define a node list in said storage structure to identify an allocation status of said at least one node, said allocation status is selected from a group of statuses comprising: an available status and an allocated status;
an allocation request manager, coupled to said storage structure, to receive an allocation request including a class identifier;
a response allocation manager, coupled to said storage structure, to respond to said allocation request with a node identifier representing said available node and updating said available node allocation status to said allocated status if said class identifier is identified in said class list and said node list identifies an available node selected from said at least one node having said available status, and otherwise to respond to said allocation request with a failure indication; and
a deallocation request manager, coupled to said storage structure, to receive a deallocation request including a release node identifier representing a release node selected from said at least one node;
a response deallocation manager, coupled to said storage structure, and to respond to said deallocation request by updating said allocation status, corresponding with said release node, to said available status; and
a processor, coupled with said configuration manager, said allocation request manager, said response allocation manager, said deallocation request manager, and said response deallocation manager for managing said first memory.

11. The system of claim 10, wherein said configuration identifies one class, and said status further comprises a recycle list to identify a recycle status for each of said at least one node, said recycle status is selected from a group of second statuses comprising a previous allocated status and a new status;
  said response allocation manager further comprises responding with said recycle status when responding with said node identifier; and
  said response deallocation manager further comprises updating said recycle status, corresponding with said release node, to said previous allocated status when responding to said deallocation.

12. The system of claim 11, wherein said previous allocated status indicates instantiation of a class instance is not required.

13. The system of claim 10, wherein said class list identifies one class, and wherein said status further comprises a recycle list to identify a recycle status for each of said at least one node, said recycle status is selected from a group of second statuses comprising: (i) a previous allocated status to indicate instantiation is not required, (ii) a partial previous allocated status to indicate a partial instantiation is suggested, and (iii) a new status to indicate instantiation is required.

14. A memory management system for managing allocation and deallocation a first memory, said system comprising:
  means for storing a storage structure including a first memory selected from said at least one memory;
  means for configuring, coupled to said storage structure, for receiving a configuration and for configuring said first memory, said configuring including allocation of at least one node in said first memory; and defining a status in said storage structure including:
    defining a class list in said storage structure for identifying at least one class, wherein each node of said at least one node is capable of storing a class instance corresponding to a class selected from said class list; and
    defining a node list in said storage structure for identifying an allocation status of said at least one node, said allocation status is selected from a group of first statuses comprising: an available status and an allocated status;
  means for allocation request, coupled to said storage structure, for receiving an allocation request including a class identifier;
  means for allocation response, coupled to said storage structure, for responding to said allocation request with a node identifier representing said available node and updating said available node allocation status to said allocated status if said class identifier is identified in said class list and said node list identifies an available node selected from said at least one node having said available status, and otherwise to respond to said allocation request with a failure indication;
  means for deallocation request, coupled to said storage structure, for receiving a deallocation request including a release node identifier representing a release node selected from said at least one node;
  means for deallocation response, coupled to said storage structure, for responding to said deallocation request by updating said allocation status, corresponding with said release node, to said available status; and
  a processor means, coupled with said means for storing, said means for configuring, said means for allocation request, said means for allocation response, said means for deallocation request, and said means for deallocation response, for managing said first memory.

15. A computer-readable medium encoded with a computer program code for memory management, the program code causing a computer to execute a method comprising:
  (A) configuring a first memory selected from said at least one memory, said configuring including allocating at least one node in said first memory; and defining a status including:
    defining a class list to identify at least one class, wherein each node of said at least one node is capable of storing a class instance corresponding to a class selected from said class list; and
    defining a node list to identify an allocation status of said at least one node, said allocation status is selected from a group of first statuses comprising: an available status and an allocated status;
  (B) receiving an allocation request including a class identifier,
  (C) responding to said allocation request with a node identifier representing said available node and updating said available node allocation status to said allocated status if said class identifier is identified in said class list and said node list identifies an available node selected from said at least one node having said available status;

(D) otherwise responding to said allocation request with a failure indication;

(E) receiving a deallocation request including a release node identifier representing a release node selected from said at least one node; and (F) responding to said deallocation request by updating said release node allocation status to said available status.

16. A router comprising: a plurality of processors; an input/output interface coupled with at least one of said plurality of processors;

at least one memory coupled with each of said processors, said memory storing procedures and data;

said data including at least one node allocated in said at least one memory, a status including a class list to identify at least one class, wherein each node of said at least one node is capable of storing a class instance corresponding to a class selected from said class list, and a node list to identify an allocation status of said at least one node, said allocation status is selected from a group of first statuses comprising: an available status and an allocated status;

an allocation receiving procedure for receiving an allocation request including a class identifier, an allocation response procedure for responding to said allocation request with a node identifier representing said available node and updating said available node allocation status to said allocated status if said class identifier is identified in said class list and said node list identifies an available node selected from said at least one node having said available status and otherwise responding to said allocation request with a failure indication;

a deallocation receiving procedure for receiving a deallocation request including a release node identifier representing a release node selected from said at least one node; and a deallocation response procedure for responding to said deallocation request by updating said release node allocation status to said available status;

said procedures for managing said allocation requests and said deallocation requests.

17. The router of claim 16, wherein said procedures interacting with said input/output interface for managing said allocation requests and said deallocation requests.

18. A computer program product for use in conjunction with a computer system, the computer program product comprising a computer readable storage medium and a computer program mechanism embedded therein, the computer program mechanism comprising:

a program module that directs computer system components to function in a specified manner including managing allocation and deallocation of at least one memory for said computer system, the program module including instructions for:

(A) configuring a first memory selected from said at least one memory, said configuring including allocating at least one node in said first memory; and defining a status including:

(B) receiving an allocation request including a class identifier, (C) responding to said allocation request with a node identifier representing a first node in said at least one node that is available according to said status and correspondingly updating said status to indicate said first node is unavailable, and otherwise responding to said allocation request with a failure indication;

(E) receiving a deallocation request including a release node identifier representing a release node representing a node in said at least one node; and (F) responding to said deallocation request by updating said status to indicate said release node is available.

19. The computer program product of claim 18, wherein defining said status further comprises:

defining a class list to identify at least one class, wherein each node of said at least one node is capable of storing a class instance corresponding to a class selected from said class list; and defining a node list to identify an allocation status of said at least one node, said allocation status is selected from a group of first statuses comprising: an available status and an allocated status.

* * * * *